United States Patent
Abe et al.

(10) Patent No.: US 8,920,960 B2
(45) Date of Patent: Dec. 30, 2014

(54) POROUS FILM FOR SEPARATOR, BATTERY SEPARATOR, BATTERY ELECTRODE, AND MANUFACTURING METHODS THEREFOR, AND LITHIUM SECONDARY BATTERY

(75) Inventors: Hiroshi Abe, Osaka (JP); Toshihiro Abe, Osaka (JP); Nobuaki Matsumoto, Osaka (JP); Hideaki Katayama, Osaka (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 675 days.

(21) Appl. No.: 12/989,897

(22) PCT Filed: Jun. 9, 2009

(86) PCT No.: PCT/JP2009/060538
§ 371 (c)(1),
(2), (4) Date: Oct. 27, 2010

(87) PCT Pub. No.: WO2009/151054
PCT Pub. Date: Dec. 17, 2009

(65) Prior Publication Data
US 2011/0039145 A1 Feb. 17, 2011

(30) Foreign Application Priority Data
Jun. 9, 2008 (JP) .................. 2008-150186

(51) Int. Cl.
*H01M 2/16* (2006.01)
*H01M 2/14* (2006.01)
*H01M 2/18* (2006.01)
*H01M 10/052* (2010.01)

(52) U.S. Cl.
CPC .............. *H01M 2/162* (2013.01); *H01M 2/145* (2013.01); *H01M 2/166* (2013.01); *H01M 2/1666* (2013.01); *H01M 2/18* (2013.01); *H01M 10/052* (2013.01); *Y02E 60/122* (2013.01)
USPC .......................................... 429/144; 429/209

(58) Field of Classification Search
USPC ........................................ 429/144, 209, 247
See application file for complete search history.

(56) References Cited

U.S. PATENT DOCUMENTS

| 5,698,176 A | 12/1997 | Capparella et al. |
| 6,190,800 B1 | 2/2001 | Iltchev et al. |

(Continued)

FOREIGN PATENT DOCUMENTS

| CN | 1189809 A | 8/1998 |
| CN | 1394192 A | 1/2003 |

(Continued)

OTHER PUBLICATIONS

Office Action for corresponding Chinese Patent Application No. 200980121546.X, dated Dec. 25, 2012.

(Continued)

*Primary Examiner* — Mark F Huff
*Assistant Examiner* — Monique Willis
(74) *Attorney, Agent, or Firm* — Birch, Stewart, Kolasch & Birch, LLP

(57) ABSTRACT

The present invention provides a lithium secondary battery using a separator including a porous film formed by binding inorganic oxide particles together with a binder. The inorganic oxide particles are treated so that an amount of alkali metal elements eluted therefrom when they are immersed in ion exchange water is reduced to 1000 ppm or less. As a result, it is possible to provide a lithium secondary battery with a high degree of reliability, whose characteristics deteriorate less when it is used or stored for an extended period.

22 Claims, 2 Drawing Sheets

(56) References Cited

U.S. PATENT DOCUMENTS

| | | |
|---|---|---|
| 6,447,958 B1 | 9/2002 | Shinohara et al. |
| 2001/0053475 A1* | 12/2001 | Ying et al. ............... 429/137 |
| 2003/0211392 A1 | 11/2003 | Nanjundaswamy et al. |
| 2007/0264577 A1 | 11/2007 | Katayama et al. |
| 2009/0067119 A1 | 3/2009 | Katayama et al. |
| 2009/0136848 A1 | 5/2009 | Minami et al. |
| 2010/0227229 A1* | 9/2010 | Toida et al. ............... 429/410 |

FOREIGN PATENT DOCUMENTS

| | | |
|---|---|---|
| CN | 1692509 A | 11/2005 |
| JP | 2000-30686 A | 1/2000 |
| JP | 2000-58119 A | 2/2000 |
| JP | 2003-221227 A | 8/2003 |
| JP | 2006-56754 A | 3/2006 |
| JP | 2007-157723 A | 6/2007 |
| JP | 2007-273443 A | 10/2007 |
| JP | 2007-280911 A | 10/2007 |
| JP | 2008-123996 A | 5/2008 |
| JP | 2009-32677 A | 2/2009 |
| WO | WO 2006/062153 A1 | 6/2006 |
| WO | WO 2007/066768 A1 | 6/2007 |

OTHER PUBLICATIONS

Korean Office Action for Korean Patent Application No. 10-2010-7026558 dated May 29, 2012.

Machine-generated English translation of JP-2006-56754-A dated Mar. 2, 2006.

International Search Report issued in PCT/JP2009/060538 dated Sep. 8, 2009.

The Office Action, mailed on Aug. 14, 2013, issued in corresponding Chinese Patent Application No. 200980121546.X.

* cited by examiner

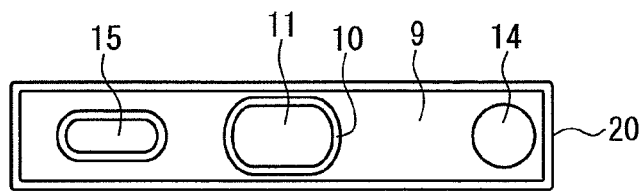
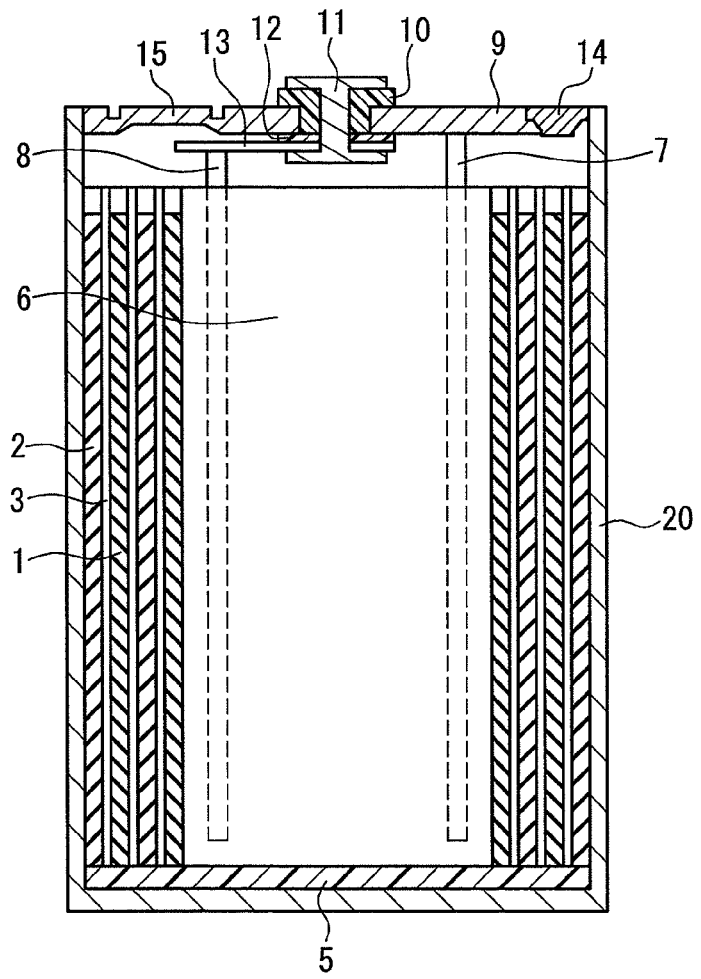

ium secondary battery, battery electrode, and manufacturing methods therefor, and lithium secondary battery

POROUS FILM FOR SEPARATOR, BATTERY SEPARATOR, BATTERY ELECTRODE, AND MANUFACTURING METHODS THEREFOR, AND LITHIUM SECONDARY BATTERY

TECHNICAL FIELD

The present invention relates to a porous film for a separator having excellent size stableness at high temperatures and used for forming a lithium secondary battery whose characteristics deteriorate less when it is used or stored for an extended period, and to a method for manufacturing the porous film for a separator. The present invention also relates to a battery separator including the porous film for a separator and a method for manufacturing the battery separator, a battery electrode including the porous film for a separator and a method for manufacturing the battery electrode, and a lithium secondary battery using the battery separator or the battery electrode.

BACKGROUND ART

Lithium secondary batteries as typical batteries using a nonaqueous electrolyte have been used widely as power sources for such portable devices as a mobile phone and a notebook personal computer because of their high energy density. Since lithium secondary batteries use chemically highly active lithium ions and an electrolyte (nonaqueous electrolyte) containing a flammable organic solvent, various portions of the batteries are provided with safety mechanisms for preventing ignition and smoking under abnormal conditions. The capacities of lithium secondary batteries are likely to increase further as the performance of the portable devices becomes higher. Therefore, it is important to further ensure both safety and reliability.

In the current lithium secondary battery, for example, a polyolefin microporous film with a thickness of about 20 to 30 μm is used as a separator that is interposed between a positive electrode and a negative electrode. However, the separator that is used generally at present is likely to shrink when the temperature inside the battery becomes extremely high, which may lead to a short circuit. For this reason, studies to improve separators have been conducted to further improve the safety and reliability of lithium secondary batteries.

For example, Patent documents 1 to 4 each propose to use a separator including filler particles having excellent heat resistance and a resin component for ensuring a shutdown function for forming an electrochemical element such as a lithium secondary battery.

PRIOR ART DOCUMENT

Patent Documents

Patent document 1: JP 2000-30686 A
Patent document 2: WO 2006/62153 A
Patent document 3: JP 2007-273443 A
Patent document 4: JP 2007-280911 A

DISCLOSURE OF INVENTION

Problem to be Solved by the Invention

As disclosed in Patent documents 1 to 4, by using the separator formed of a porous substrate and filler particles both having excellent heat resistance, it is possible to provide a lithium secondary battery with excellent safety in which a thermal runaway is less likely to occur even in the event of overheating.

However, studies conducted by the inventors of the present invention have revealed the following. Depending on the types of filler particles used in the separator, the capacities of the lithium secondary batteries disclosed in these Patent documents drop when they are used for an extended period and charged/discharged repeatedly for numerous times or are stored for an extended period in a charged state.

In other words, it has become evident that there are filler particles that include a large amount of alkali metal elements such as Na as impurities depending on the types and the conditions under which particles are manufactured, and when such filler particles are used for forming the separator, a large amount of alkali metal elements, particularly Na, get inside the lithium secondary battery, causing deterioration of the charge/discharge cycle characteristic and long-term storage characteristic.

Means for Solving Problem

With the foregoing in mind, the present invention provides a porous film for a separator used for forming a lithium secondary battery with a high degree of reliability whose characteristics deteriorate less when it is used or stored for an extended period and a battery separator and an electrode including the porous film for a separator so as to provide a lithium secondary battery using the battery separator or electrode.

The porous film for a separator of the present invention is a porous film including inorganic oxide particles and a binder for binding the inorganic oxide particles together. The inorganic oxide particles include boehmite and the amount of Na contained in the porous film is 1000 ppm or less.

Further, the battery separator of the present invention includes the porous film for a separator of the present invention and a microporous film including a heat-melting resin layer having a melting point of 80 to 140° C.

Further, the battery electrode of the present invention includes an active material containing layer and the porous film for a separator of the present invention. The active material layer and the porous film for a separator are integrated with each other.

Further, the lithium secondary battery of the present invention includes a positive electrode, a negative electrode, a separator and a nonaqueous electrolyte. The separator is the battery separator of the present invention.

Further, as another form of the lithium secondary battery of the present invention different from the form described above, the lithium secondary battery includes a positive electrode, a negative electrode, a separator and a nonaqueous electrolyte. At least one of the positive electrode and the negative electrode is the battery electrode of the present invention.

Further, a method for manufacturing a porous film for a separator of the present invention includes steps of washing inorganic oxide particles with water to reduce the amount of alkali metal elements included in the inorganic oxide particles to 1000 ppm or less; and binding the inorganic oxide particles together with a binder to form a porous film containing the inorganic oxide.

Further, a method for manufacturing a battery separator of the present invention includes steps of washing inorganic oxide particles with water to reduce the amount of alkali metal elements included in the inorganic oxide particles to 1000 ppm or less; and binding the inorganic oxide particles together with a binder to form a porous film containing the inorganic oxide particles on a microporous film including a heat-melting resin layer having a melting point of 80 to 140° C.

Further, a method for manufacturing a battery electrode of the present invention includes steps of washing inorganic oxide particles with water to reduce the amount of alkali metal elements included in the inorganic oxide particles to 1000 ppm or less; and binding the inorganic oxide particles together with a binder to form a porous film containing the inorganic oxide particles on an electrode including an active material containing layer.

Effects of the Invention

According to the present invention, it is possible to provide a lithium secondary battery with a high degree of reliability, whose characteristics deteriorate less when it is used or stored for an extended period.

BRIEF DESCRIPTION OF DRAWINGS

FIG. 1A is a schematic plan view of the lithium secondary battery of the present invention and FIG. 1B is a schematic cross-sectional view of the lithium secondary battery of the present invention.

DESCRIPTION OF THE INVENTION

Embodiment 1

Figure 2:
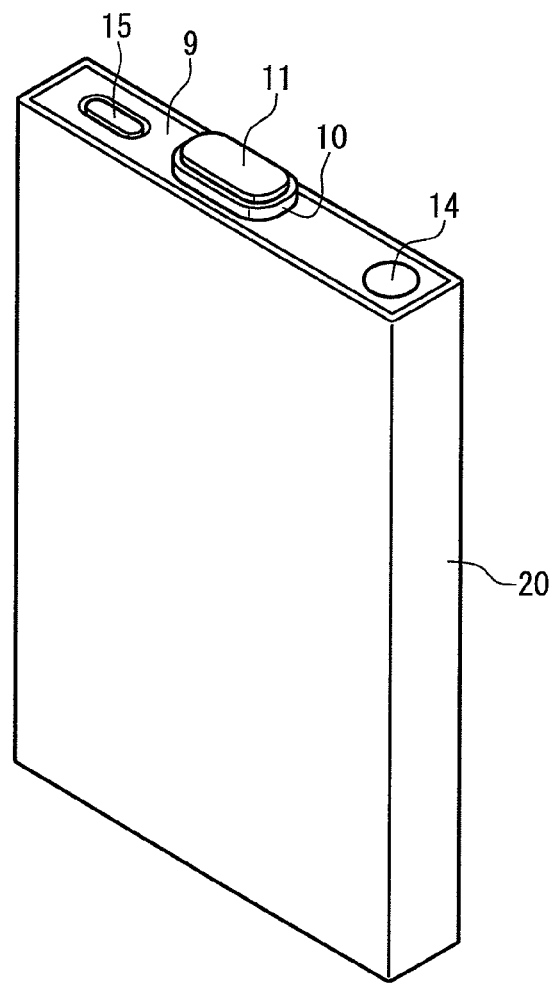
FIG. 2 is a schematic external view of the lithium secondary battery of the present invention.

First, the porous film for a separator and the method for manufacturing the porous film for a separator, the battery separator and the method for manufacturing the battery separator and the battery electrode and the method for manufacturing the battery electrode of the present invention will be described.

The porous film used for forming the battery separator of the present invention (hereinafter simply referred to as "separator") contains inorganic oxide particles. The porous film is formed by binding the inorganic oxide particles together with a binder, and contains boehmite as the inorganic oxide particles. An amount of alkali metal elements contained in the porous film, particularly Na, is 1000 ppm or less (on the basis of mass, the same applies also in the following).

Among the alkali metal elements contained in the separator, those that are present in a water-elutable state, particularly Na, can become a cause of deterioration of lithium secondary battery characteristics when the battery is charged/discharged repeatedly for an extended period or stored for an extended period. That is, within a battery, it is believed that alkali metal elements in a separator cause a side reaction of an organic solvent contained in a nonaqueous electrolyte. Due to this side reaction, gas is generated when the battery is stored for an extended period particularly in a charged state, causing battery swelling. As a result, the capacity of the battery drops. Also, due to an increase in the irreversible capacity resulting from the side reaction, the capacity of the battery appears to drop when the battery is charged/discharged repeatedly.

For this reason, by reducing the amount of the alkali metal elements, particularly Na, in the porous film for a separator of the present invention to 1000 ppm or less, a side reaction of the organic solvent which occurs when forming the separator is suppressed so as to prevent a drop in the battery capacity when the battery is stored for an extended period or when the battery is used for an extended period and charged/discharged repeatedly.

The alkali metal elements may be present in the porous film or the separator also in the form of a compound, such as a hydroxide, an oxide or a carbonate, containing the elements, in addition to metal composed of these elements and an alloy containing these elements. In this specification, "the amount of alkali metal elements" and "the amount of Na" each refer to a ratio of the amount of alkali metal elements eluted in ion exchange water from a target sample (the porous film for a separator, the separator and inorganic oxide particles (described later)) measured using inductively coupled high-frequency plasma emission spectroscopy (ICP emission spectroscopy) to the mass of the original sample (mass including alkali metal elements). The eluted amount is measured by immersing 0.5 g of the target sample into 25 cm$^3$ of the ion exchange water at 25° C. for 12 hours, and following the immersion, diluting the ion exchange water by 10 times.

Here, the amount of the alkali metal elements in the separator is preferably smaller, and most preferably the amount is 0 ppm. However, since it is difficult to manufacture the separator so as to be completely free of alkali metal elements when using boehmite as the inorganic oxide particles, the lower limit tends to be about 10 ppm under normal conditions.

The porous film for a separator of the present invention contains inorganic oxide particles, and contains boehmite as the inorganic oxide particles. Because the separator of the present invention includes the porous film for a separator, when forming an electrode body by pressing positive and negative electrodes against each other via the separator, it is possible to prevent the occurrence of a short circuit resulting from a positive electrode active material passing through the separator and coming into contact with the negative electrode in a temperature range where the battery is usually used. Further, because of the presence of the inorganic oxide particles, thermal shrinkage of the separator resulting from an increase in the temperature of the battery is prevented and the shape of the separator is maintained. Thus, it is also possible to prevent a short circuit resulting from direct contact between the positive and negative electrodes, which may occur due to thermal shrinkage of the separator. Accordingly, batteries using the separator of the present invention (batteries such as the lithium secondary battery of the present invention and a nonaqueous primary battery) can exhibit excellent safety and reliability.

In order to achieve the above-described effects more readily, it is desirable that the porous film for a separator of the present invention is composed mainly of the inorganic oxide particles, in other words, it is desirable to adopt such a configuration that the proportion of the inorganic oxide particles is 50% by volume or more of the total volume of the components of the porous film (but not including a sheet material made of a fibrous material (described later)).

Normally, boehmite expressed by a composition formula such as AlOOH or $Al_2O_3 \cdot H_2O$ includes a large amount of alkali metal elements due to the method in which it is manufactured. Generally, the amount of alkali metal elements included in commercially available boehmite exceeds 1000 ppm. Further, the amount of alkali metal elements included in other inorganic oxide particles may exceed 1000 ppm depending on the methods in which they are manufactured.

Thus, when such inorganic oxide particles are used for forming the separator, a large amount of alkali metal elements are to be blended in the separator, which can become a cause of triggering the problems described above.

Therefore, when using inorganic oxide particles, particularly boehmite, including a large amount of alkali metal elements, it is necessary to subject the inorganic oxide particles to a treatment for removing alkali metal elements in advance.

For the inorganic oxide particles to be used in the porous film for a separator of the present invention or the separator of the present invention, the amount of alkali metal elements, particularly Na, is preferably 1000 ppm or less, more preferably 600 ppm or less and most preferably 0 ppm. Among alkali metal elements, Na in particular has a strong effect of causing deterioration of the long-term storage characteristic and charge/discharge characteristic of the battery. Thus, by reducing the amount of Na in the inorganic oxide particles as described above, the effects of the present invention can be exhibited more noticeably.

The way to remove alkali metal elements from the inorganic oxide particles is not particularly limited as long as other impurities are not blended in the inorganic oxide particles. For example, washing the inorganic oxide particles with water is recommended because it is easy and is advantageous also in terms of cost. The inorganic oxide particles may be washed with water repeatedly for a plurality of times until the amount of alkali metal elements becomes 1000 ppm or less (preferably until the amount of Na becomes 600 ppm or less) in batches or in a continuous mariner.

However, because it is difficult to remove alkali metal elements completely, as a guideline for the treatment, it would be sufficient to wash the inorganic oxide particles until the amount of alkali metal elements, particularly Na, becomes about 10 to 500 ppm. When the alkali metal elements are present in the form of an alkaline water-soluble compound such as a hydride or a carbonate, the alkali metal elements may be removed more quickly or in larger quantity by washing the inorganic oxide particles with an aqueous solution in which inorganic acid such as hydrochloric acid or organic acid such as citric acid is solved.

In the present invention, the inorganic oxide particles are not particularly limited as long as electrochemically-stable inorganic oxide particles that have heat resistance and electrical insulation, are stable to an electrolyte and are less susceptible to oxidation-reduction in the operating voltage range of a battery are used. The examples include, in addition to iron oxide, $SiO_2$, $Al_2O_3$, $TiO_2$, $BaTiO_3$ and $ZrO_2$, materials derived from the mineral resources such as boehmite, zeolite, apatite, kaoline, mullite, spinel, olivine, and mica or artificial products of these materials. As the heat resistance, it is desirable that the material does not deform until 150° C. or higher, and preferably 180° C. or higher.

Among the above-described inorganic oxides, $Al_2O_3$, $SiO_2$, and boehmite can be used preferably, and boehmite in particular can be used preferably. As described above, in boehmite, a large amount of alkali metal elements derived from the method in which boehmite is manufactured are normally blended. Thus, when boehmite is contained in the separator, the effects of the present invention become particularly noticeable. Of course, inorganic oxide particles other than boehmite that include a large amount of elutable alkali metal elements can be preferably used in the present invention.

The average particle size of the inorganic oxide particles is preferably 0.01 μm or more, and more preferably 0.1 μm or more because the battery characteristics can be improved further by increasing the gap between the particles to a certain extent so as to shorten the conduction path of ions. On the other hand, when the particle size of the inorganic oxide particles is too large, the gap between the particles becomes too large and a short circuit caused by lithium dendrites may be likely to occur. Thus, the average particle size of the inorganic oxide particles is preferably 10 μm or less, and more preferably 5 μm or less.

In this specification, the average particle size of the particles is the particle size with an accumulated volume percentage of 50% (D50%) that is measured with a laser diffraction particle size analyzer (e.g., "LA-920" manufactured by Horiba, Ltd.) by dispersing the particles in a medium (e.g., water), in which the particles neither swell nor solve.

The inorganic oxide particles may have any of amorphous, granular, plate-like and cubical shapes. Further, they may be primary particles or secondary particles. When the particles have a plate-like shape, by orienting the inorganic oxide particles so that their flat surfaces in particular become in parallel with or substantially in parallel with the separator surface, paths between the positive and negative electrodes in the separator, in other words, a so-called tortuosity factor can be increased. Thus, even when dendrites are generated in the battery, the dendrites are less likely to reach the positive electrode from the negative electrode. Consequently, the reliability against a dendrite short circuit can be further improved. Further, when the inorganic oxide particles are secondary particles, the load characteristic of the battery can be improved while effectively suppressing a short circuit caused by the dendrites.

When the inorganic oxide particles have a plate-like shape, the aspect ratio (ratio between the largest length and the thickness of plate-like particles) is preferably 2 or more, more preferably 5 or more and still more preferably 10 or more because it is possible to further increase the effect of improving the reliability against the dendrite short circuit, which is achieved by orienting the particles. On the other hand, when the aspect ratio of the plate-like inorganic oxide particles is too large, the specific surface of each particle becomes too large and the ease of handing could drop. Thus, the aspect ratio is preferably 100 or less and more preferably 50 or less. The aspect ratio can be determined by analyzing an image of the particles taken with a scanning electron microscope (SEM).

When the inorganic oxide particles have a plate-like shape, it is preferable that they are present in the separator in such a form that their flat surfaces are in parallel with or substantially in parallel with the separator surface. More specifically, as to the plate-like inorganic oxide particles in the vicinity of the separator surface, it is preferable that an average angel between the flat surfaces and the separator surface is 30° or less. Most preferably, the average angle is 0°, in other words, the plate-like flat surfaces in the vicinity of the separator surface are in parallel with the separator surface. "In the vicinity of the separator surface" refers to an about 10% range from the separator surface to the total thickness. When the plate-like inorganic oxide particles are present in the form as described above, it is possible to prevent the occurrence of an internal short caused by lithium dendrites precipitated on the electrode surface and a protrusion of an active material from the electrode surface in a more effective manner.

In terms of further ensuring the function (the short circuit prevention function in particular) achieved by the inorganic oxide particles, the proportion of the inorganic oxide particles in the porous film constituting the separator is preferably 50% by volume or more, and more preferably 80% by volume or more of the total volume of the components of the porous film (however, when the porous film includes a sheet material formed of a fibrous material (described later), the sheet material is not included in the components). On the other hand, in order to further ensure the binding between the particles achieved by the binder and to improve the shape stableness of the film, the proportion of the inorganic oxide particles is preferably 99.5% by volume or less, and more preferably 99% by volume or less.

Further, in terms of further ensuring the short circuit prevention function, the thickness of the porous film is preferably 1 μm or more, and more preferably 3 μm or more. On the other hand, in terms of improving the energy density of the battery and reducing an impedance, the thickness of the porous film is preferably 15 μm or less, and more preferably 10 μm or less.

In the present invention, although the porous film can also be used as the separator by itself, it is desirable that the porous film forms the separator together with a microporous film including a heat-melting resin layer having a melting point of 80 to 140° C. As a result of the inclusion of the microporous film in the separator, when the separator is subjected to heat in the event of overheating or the like in the battery, a so-called shutdown occurs. In the course of the shutdown, the heat-melting resin is melted and the pores of the separator are filled with the resin Consequently, the safety of the battery can be improved. In this case, it is preferable to form the porous film on the microporous film because shrinkage of the heat-melting resin layer can be suppressed when the temperature of the separator rises after the occurrence of the shutdown.

The heat-melting resin is not particularly limited as long as an electrochemically stable heat-melting resin that has the above-described melting point and electrical insulation, is stable to an electrolyte, and is less susceptible to oxidation-reduction in the operating voltage range of a battery is used. Examples of the heat-melting resin include polyethylene (PE), copolymerized polyolefin (e.g., copolymer having 85 mol % of a structural unit derived from ethylene), a polyolefin derivative (e.g., chlorinated polyolefin), a polyolefin wax, a petroleum wax and a carnauba wax. The copolymerized polyolefin may include an ethylene-propylene copolymer and a copolymer of ethylene-vinyl monomer. More specifically, the copolymerized polyolefin may include an ethylene-vinyl acetate copolymer (EVA), an ethylene-methyl acrylate copolymer or an ethylene-ethyl acrylate copolymer. Further, it is also possible to use polycycloolefin. To minimize the temperature at which the shutdown occurs, the melting point of the heat-melting resin is preferably 130° C. or less.

The melting point of the heat-melting resin can be defined by a melting temperature that is measured with a differential scanning calorimeter (DSC) according to the regulations of the Japanese Industrial Standards (JIS) K 7121. In the present invention, a heat-melting resin having a melting temperature of 80 to 140° C. may be used.

Further, the heat-melting resin may be used solely or in combinations of two or more of the above-described constituents. Among the above-described constituents, PE, an ethylene-propylene copolymer, a polyolefin wax and an EVA having 85 mol % or more of a structural unit derived from ethylene are preferable.

The microporous film including a heat-melting resin layer having a melting point of 80 to 140° C. may be formed solely of a porous resin layer formed of a heat-melting resin having a melting point of 80 to 140° C. or it may be a laminate film of a heat-melting resin layer having a melting point of 80 to 140° C. and a porous resin layer having higher heat resistance than the heat-melting resin layer. Further, the heat-melting resin layer having a melting point of 80 to 140° C. may include a resin and a filler that have higher heat resistance than the heat-melting resin of which the heat-melting resin layer is made. Further, if needed, the heat-melting resin layer may also include a variety of known additives (e.g., an antioxidant, etc.) added to resins.

For the microporous film, any of commercially available microporous films made of heat-melting resin, such as a polyethylene microporous film and a laminate film of a polyethylene microporous film and a polypropylene microporous film, can be used preferably. Further, a microporous film formed by binding particles made of the heat-melting resin together with a binder may also be used.

The thickness of the microporous film, particularly the thickness of the heat-melting resin layer is preferably 3 μm or more, and more preferably 5 μm or more. On the other hand, in terms of improving the energy density of the battery and reducing an impedance, the thickness is preferably 30 μm or less, and more preferably 15 μm or less.

In terms of further ensuring the functions (the short circuit prevention function in particular) achieved by the inorganic oxide particles, the proportion of the inorganic oxide particles in the separator is preferably 10% by volume or more, more preferably 30% by volume or more, and particularly 40% by volume or more of the total volume of the components of the separator. On the other hand, the proportion of the inorganic oxide particles in the separator is preferably 80% by volume or less. When the separator includes a sheet material formed of a fibrous material (described later), the volume percentage of the inorganic oxide particles represents the percentage of the total volume of the components of the separator except the sheet material.

Further, when forming the porous film for a separator on one or both sides of the microporous film, the thickness of the porous film(s) (total thickness) is preferably 10% or more, and more preferably 20% or more of the thickness of the microporous film (total thickness). This is because thermal shrinkage of the microporous film occurring at high temperatures becomes easier to suppress.

The porous film for a separator of the present invention or the separator of the present invention may contain a fibrous material as a reinforcing material to enhance its strength. For the fibrous material, there is no particular limitation as long as a material that has electrical insulation and is electrochemically stable and further stable to a nonaqueous electrolyte (described later in detail) is used. It is desirable to use a material that does not substantially deform at 150° C. (a material on which deformation cannot be visually observed even when it is heated to 150° C.) is desirable.

When including the fibrous material in the porous film for a separator, the porous film can be formed by binding the fibrous material and the inorganic oxide particles together with a binder. Further, the porous film can also be formed by letting the inorganic oxide particles contained in pores of a sheet material formed of the fibrous material and fixing the inorganic oxide particles to the sheet material with a binder.

Further, when including the fibrous material in the microporous film, the porous resin layer can be formed by binding the fibrous material and heat-melting resin particles having a melting point of 80 to 140° C. together with a binder. Further, the porous resin layer can also be formed by letting the heat-melting resin particles contained in pores of a sheet material formed of the fibrous material and fixing the heat-melting resin particles to the sheet material with a binder.

In the separator using the fibrous material that does not substantially deform at 150° C., it is possible to enhance the strength of the separator without compromising the heat stability of the separator. Further, the separator using the fibrous material is particularly preferable because it is possible to prevent the inorganic oxide particles from coming off when the separator is wound together with electrodes.

In the specification, "the fibrous material" refers to a material whose aspect ratio [length in the length direction/width in the direction perpendicular to the length direction (diameter)] is 4 or more. The aspect ratio of the fibrous material is preferably 10 or more.

Examples of the constituents of the fibrous material include: resins, such as cellulose, cellulose modified product (such as carboxymethyl cellulose), polypropylene (PP), polyester [such as polyethylene terephthalate (PET), polyethylene naphthalate (PEN), and polybutylene terephthalate (PBT)], polyacrylonitrile (PAN), polyvinylalcohol (PVA), aramid, polyamide imide and polyimide; and inorganic materials (inorganic oxides) such as glass, alumina and silica. The fibrous material may include one of or two or more of these constituents. Further, in addition to the above-described constituent(s), the fibrous material also may include a variety of additives (e.g., an antioxidant when the fibrous material is formed of a resin) as its constituent as needed.

Although the diameter of the fibrous material is not limited as long as it is equal to or less than the thickness of the separator, the diameter is preferably 0.01 μm to 5 μm, for example. When the diameter is too large, the following problem may occur. That is, when a sheet material (described later) formed of an aggregate of a number of fibers of the fibrous material is used, intertwining of the fibers becomes insufficient and the strength of the sheet material formed of the fibrous material declines. As a result, the effect of enhancing the strength of the separator achieved by using the fibrous material may become small. On the other hand, when the diameter of the fibrous material is too small, the pores of the separator become too small and the ion permeability tends to drop. This may result in deterioration of the load characteristic of a battery using such a separator.

For the separator containing the fibrous material, a sheet material formed of an aggregate of a number of pieces of the fibrous material, such as a sheet material in the form of a woven fabric, a nonwoven fabric or paper is used preferably, and the separator in which the inorganic oxide particles, etc. are contained in the pores of the sheet material can be configured. Further, the separator may be configured to contain pieces of the fibrous material, the inorganic oxide particles, etc. that are dispersed uniformly in the separator. Alternatively, the separator can also have a combination of the both configurations described above. The inorganic oxide particles and the like can be fixed with a binder or the like as needed.

When the fibrous material is in the form of a sheet material, in terms of ensuring the preferred volume percentage of the inorganic oxide particles and the mechanical strength of the sheet material such as tensile strength, the weight (basis weight) and thickness of the sheet material are preferably 3 to 30 g/m$^2$ and 7 to 20 μm, respectively. Furthermore, the amount of the fibrous material in the separator is preferably 10 to 50% by volume of the total volume of the separator components including the fibrous material.

In addition to the inorganic oxide particles and the fibrous material, the separator of the present invention can also contain a filler other than inorganic oxide particles and particles made of the above-described heat-melting resin.

For the filler, any material that has electric insulation, is stable to a nonaqueous electrolyte included in a battery and is less susceptible to side reactions such as oxidation-reduction in the operating voltage range of a battery may be used. Examples of such materials include: inorganic nitrides such as an aluminum nitride and a silicon nitride; hardly-soluble electrovalent compounds such as a calcium fluoride, a barium fluoride, and barium sulfate; covalent compounds such as silicon and diamond; and days such as montmorillonite. Moreover, the filler may be in the form of electrically insulating particles obtained by covering the surface of a conductive material with a material having electrical insulation. Examples of the conductive material include conductive oxides such as a metal, $SnO_2$, and an indium tin oxide (ITO), and carbonaceous materials such as carbon black and graphite.

Examples of the filler further include the following resins: a variety of cross-linked polymers such as cross-linked polymethyl methacrylate, cross-linked polystyrene, cross-linked polydivinylbenzene, a cross-linked styrene-divinylbenzene copolymer, polyimide, a melamine resin, a phenol resin, and a benzoguanamine-formaldehyde condensation product; and heat-resistant polymers such as PP, polysulfone, polyethersulfone, polyphenylenesulfide, polytetrafluoroethylene, PAN, aramid, polyacetals and thermal-plastic polyimide. These resins may be a mixture, a modified product, a derivative, a copolymer (a random copolymer, an alternating copolymer, a block copolymer, or a graft copolymer) of the above-described exemplary materials, or a cross-linked product of the heat-resistant polymers.

The average particle size of the filler and the heat-melting resin particles is preferably in a range of 0.001 μm to 15 μm and more preferably in a range of 0.1 μm to 1 μm as D50% determined by the above-described measurement.

Further, the porous film for a separator of the present invention or the separator of the present invention may include a binder for the purpose of binding the inorganic oxide particles together or binding together the inorganic oxide particles and the materials that are used as needed such as the fibrous material (and the sheet material thereof), the filler and the heat-melting resin particles.

For the binder, any electrochemically stable material that is stable to a nonaqueous electrolyte and bonds the inorganic oxide pa/tides, the fibrous material, the filler, the heat-melting resin particles and the like favorably may be used. Examples of such materials include EVA (having 20 to 35 mol % of a structural unit derived from vinyl acetate); an ethylene-acrylic acid copolymer such as an ethylene-ethyl acrylate copolymer; fluoro-rubber; styrene-butadiene rubber (SBR); carboxymethyl cellulose (CMC); hydroxyethyl cellulose (HEC); polyvinyl alcohol (PVA); polyvinyl butyral (PVB); polyvinyl pyrrolidone (PVP); polyurethane; and an epoxy resin. The above examples may be used solely or in combinations of two or more. Further, for the binder, a material that does not melt or dissolve until 150° C. or higher, and preferably 180° C. or higher is desirable in terms of heat resistance.

Further, when the above-described heat-melting resin can also function as a binder, the heat-melting resin can be used also as the binder.

When using one or more of these binders, the binder may be used by dissolving it in a solvent of a composite for forming the separator (described later) or may be used in the form of emulsion or plastisol by dispersing the binder therein. However, some of the binders may be in the form of alkali metal salt such as Na and alkali metal elements such as Na resulting from a surfactant may be blended in a binder solution or emulsion. Thus, due to these alkali metal elements, the amount of alkali metal elements in the separator may increase. For this reason, it is desirable to use materials with less alkali metal elements (alkali metal elements present in a water-elutable state in particular) for the constituents of the separator of the present invention besides the inorganic oxide particles.

In terms of further increasing the effect of preventing short circuits in the battery and ensuring the strength of the separator to improve its ease of handing, the thickness of the separator is preferably 3 μm or more, and more preferably 5 μm or more. On the other hand, in terms of increasing the energy density of the battery and further reducing an impedance, the thickness of the separator is preferably 50 μm or less, and more preferably 30 μm or less.

To improve the ion permeability by ensuring the holding of a nonaqueous electrolyte, the porosity of the separator is preferably 20% or more, and more preferably 30% or more in a dry state. On the other hand, in terms of ensuring the strength of the separator and preventing internal short circuits, the porosity of the separator is preferably 70% or less, and more preferably 60% or less in a dry state. The porosity of the separator can be calculated from the thickness of the separator, the mass per unit area of the separator, and the densities of the components of the separator.

It is desirable that the separator of the present invention has a Gurley value (air resistance) of 10 to 300 sec. The Gurley value is obtained by a method according to JIS P 8117 and expressed as the length of time (seconds) it takes for 100 mL air to pass through a membrane at a pressure of 0.879 g/mm$^2$. If the air resistance is too large, the ion permeability can be reduced. On the other hand, if the air resistance is too small, the strength of the separator can be reduced. Further, it is desirable that the strength of the separator is penetrating strength measured using a 1 mm diameter needle, and that the penetrating strength is 50 g or more. If the penetrating strength is too small, lithium dendrite crystals may penetrate the separator when they are produced, thus leading to a short circuit.

For the method for manufacturing the separator of the present invention, any of the following methods (I), (II) and (III) can be adopted, for example.

<Manufacturing Method (I)>

In the manufacturing method (I), a composition (e.g., slurry) for forming the separator containing the inorganic oxide particles and a solvent is applied onto an ion permeable sheet material (woven fabric, nonwoven fabric, etc.) formed of the fibrous material using a blade coater, a roll coater, a die coater or the like, and then, the sheet material and the applied composition are dried at a predetermined temperature.

Examples of the "sheet material" mentioned in this manufacturing method include a porous sheet, such as a nonwoven fabric formed of at least one of the fibrous materials and having a structure in which these fibrous materials are intertwined with each other. More specifically, a nonwoven fabric such as paper, a PP nonwoven fabric, a polyester nonwoven fabric (e.g., a PET nonwoven fabric, a PEN nonwoven fabric and a PBT nonwoven fabric) or a PAN nonwoven fabric can be used preferably.

The composition for forming the separator contains the inorganic oxide particles as well as other materials such as a filler, heat-melting resin particles, a binder and the like as needed, and is prepared by dispersing these materials in a solvent (including a dispersion medium, the same applies also in the following). However, the binder may be dissolved in the solvent. The solvent used for the composition for forming the separator is not particularly limited as long as a solvent in which the inorganic oxide particles, the filler, the heat-melting resin particles and the like can be dispersed uniformly and also the binder can be dissolved or dispersed uniformly is used. In general, for example, organic solvents, including aromatic hydrocarbons such as toluene, furans such as tetrahydrofuran, and ketones such as methyl ethyl ketone and methyl isobutyl ketone, can be suitably used. Alcohols (ethylene glycol, propylene glycol, etc.) or a variety of propylene oxide glycol ethers such as monomethyl acetate may be appropriately added to those solvents to control the surface tension. Further, when the binder is water-soluble or the binder is used in the form of emulsion, water may be used as a solvent. Also in this case, alcohols (methyl alcohol, ethyl alcohol, isopropyl alcohol, ethylene glycol, etc.) can be appropriately added to control the surface tension.

In the composition for forming the separator, the total solid content of the inorganic oxide particles, the filler, the heat-melting resin particles and the binder is preferably 30 to 70 mass %, for example.

Further, the composition for forming the separator may not be a sole composition containing all of the inorganic oxide particles, the heat-melting resin particles, the binder and the like, and a plurality of types of compositions with different components may be used. For example, two types of compositions, a composition (1) containing the inorganic oxide particles and the binder and a composition (2) containing the heat-melting resin particles and the like, may be used. And when using the two types of compositions (1) and (2), the separator having a plurality of layers can be manufactured as follows. First, the composition (1) is applied to the sheet material and is dried to form a supporting layer (the porous film for a separator), and then, the composition (2) is applied to the supporting layer and dried to form a shutdown layer.

Further, the supporting layer (the porous film for a separator) may be used solely as the separator, or it may also be used as the separator in combination with the above-described microporous film including a heat-melting resin layer having a melting point of 80 to 140° C.

Further, the number of at least one of the supporting layer (the porous film for a separator) and the shutdown layer (the heat-melting resin layer) may be two or more.

Like a nonwoven fabric such as paper, a PP nonwoven fabric or a polyester nonwoven fabric, when the sheet material is formed of the fibrous material and particularly has a relatively large pore diameter (e.g., when the pore diameter is 5 μm or more), this tends to cause a battery short circuit. In such a case, therefore, it is preferable that a part or the whole of the inorganic oxide particles is contained in the pores of the sheet material. Further, in addition to the inorganic oxide particles, it is more preferable that a part or the whole of the filler and the heat-melting resin particles are also contained in the pores of the sheet material. In this case, the effects resulting from the use of these particles can be exhibited more effectively.

The inorganic oxide particles, the filler, the heat-melting resin particles and the like can be present in the pores of the sheet material, for example, by applying the composition for forming the separator that include these materials to the sheet material, allowing the sheet material to pass through a predetermined gap to remove extra composition, and subsequently drying the sheet material.

Further, when the inorganic oxide particles have a plate-like shape, in order to improve their orientation to exhibit the effects resulting from the particles more effectively, for example, the composition for forming the separator that includes the inorganic oxide particles may be applied to and impregnated into the sheet material, and then subjected to shear or a magnetic field. For example, as described above, after applying the composition for forming the separator to the sheet material, the composition can be subjected to shear by allowing the sheet material to pass through a predetermined gap.

<Manufacturing Method (II)>

In the manufacturing method (II), the fibrous material is further included in the composition for forming the separator used in the manufacturing method (I) as needed. After the composition is applied to a substrate such as a film or metal foil and dried at a predetermined temperature, the dried composition is removed from the substrate. The composition for forming the separator used in this manufacturing method is the same as the composition for forming the separator used in the manufacturing method (I) except that the fibrous material is included as needed. Further, as described in the manufacturing method (I), by using two or more types of compositions for the composition for forming the separator as needed, and applying each of the compositions separately, a separator including a plurality of layers can also be formed.

Further, also in this manufacturing method, a supporting layer (the porous film for a separator) made of the composition prepared by including the fibrous material in the composition (1) may be used solely as the separator or the supporting layer may be used as the separator in combination with the above-described microporous film including a heat-melting resin layer having a melting point of 80 to 140° C. When using the supporting layer in combination with the microporous film, the separator may be formed by applying the composition prepared by including the fibrous material in the composition (1) onto the microporous film, and drying them at a predetermined temperature. In this case, it is not necessary to remove the formed porous film for a separator from the microporous film.

Furthermore, as in the case of the manufacturing method (I), it is also possible to form a separator with the number of at least one of the supporting layer (the porous film for a separator) and the shutdown layer (the heat-melting resin layer) is two or more. However, to form the porous film for a separator on both sides of the microporous film, a dryer needs to be large in size. Further, when the composition is applied and dried at a rate of a few tens of meters per minute or higher, the removal of the solvent tends to require a lot of time, which may likely to result in manufacturing-related problems Therefore, from a practical standpoint, it is desirable to form the porous film for a separator only on one side of the microporous film.

On the other hand, when forming the porous film for a separator only on one side of the microporous film, the separator tends to warp with respect to the applied surface during a drying step for removing the solvent of the composition to make the film porous. This may lead to an increase in the failure incidence during steps of winding the separator, slitting the separator or winding the separator together with electrodes. In such a case, the warping of the separator can be suppressed by using inorganic oxide particles and a filler both having a plate-like shape.

Further, when forming the porous film for a separator on one or both sides of the microporous film, the thickness (total thickness) of the porous film(s) is preferably 10% or more, and more preferably 20% or more of the thickness (total thickness) of the microporous film. When the thickness of the porous film(s) in this range, thermal shrinkage of the microporous film occurring at high temperatures becomes easier to suppress. On the other hand, in order to suppress the warping of the separator, the thickness (total thickness) of the porous film(s) is preferably 50% or less, and more preferably 40% or less of the thickness (total thickness) of the microporous film.

Also with regard to the separator obtained by the manufacturing method (II), when the fibrous material is used to form a sheet material, it is preferable that a part or the whole of the inorganic oxide particles, the filler and the heat-melting resin particles are contained in the pores of the sheet material. Further when using plate-like inorganic oxide particles, it is preferable to orient the inorganic oxide particles. In the separator obtained by this manufacturing method, a part or the whole of the various particles can be present in the pores of the sheet material, for example, by forming the separator using a composition for forming the separator that contains the fibrous material and these particles. Further, the same method as described in the manufacturing method (I) can be used to orient the plate-like inorganic oxide particles.

<Manufacturing Method (III)>

In the manufacturing method (III), the composition for forming the separator used in the manufacturing method (I) or (II) is applied to the surface of a battery electrode (a positive or negative electrode described later), for example, to the surface of an active material containing layer using a blade coater, a roll coater, a die coater or the like, and then, they are dried at a predetermined temperature. Through this manufacturing method, an electrode integrated with the porous film for a separator of the present invention or the separator of the present invention can be manufactured.

The porous film for a separator and the separator of the present invention are not limited to those having the above-described structures. For example, the inorganic oxide particles may be present independently or a part of the inorganic oxide particles may be fused with each other or with the fibrous material or the like.

Further, the battery separator and the electrode of the present invention can be used for primary batteries as well as secondary batteries as long as they use a nonaqueous electrolyte. However, their effects (particularly, preventing deterioration of characteristics following an extended period of use) can be exhibited noticeably when they are used for secondary batteries.

Embodiment 2

Next, the lithium secondary battery of the present invention will be described.

There is no particular limitation to the configuration/structure of the lithium secondary battery of the present invention as long as it uses the battery separator of the present invention. Accordingly, any of configurations/structures adopted by conventional lithium secondary batteries can be applied to the lithium secondary batter of the present invention.

The lithium secondary battery may be in the form of cylinder (rectangular, circular cylinder, etc.) using an outer can such as a steel or aluminum can. Further, the lithium secondary battery may also be a soft package battery using a metal-deposited laminated film as an outer package.

There is no particular limitation to the positive electrode as long as a positive electrode that is used for a conventional lithium secondary battery, in other words, a positive electrode that contains an active material capable of intercalating and deintercalating Li ions is used. For a positive electrode active material, any of the following can be use: a lithium-containing transition metal oxide having a layered structure expressed as $Li_{1+x}MO_2$ ($-0.1<x<0.1$, M: Co, Ni, Mn, Al, Mg, etc.); a lithium manganese oxide having a spinel structure in which $LiNIn_2O_4$ and some of the elements are substituted with other elements; and an olivine-type compound expressed as $LiMPO_4$ (M: Co, Ni, Mn, Fe, etc.). Specific examples of the lithium-containing transition metal oxide having a layered structure include, in addition to $LiCoO_2$ and $LiNi_{1-x}Co_{x-y}Al_yO_2$ ($0.1 \leq x \leq 0.3$, $0 \leq y \leq 0.2$), oxides containing at least Co, Ni and Mn ($LiMn_{1/3}Ni_{1/3}Co_{1/3}O_2$, $LiMn_{5/12}Ni_{5/12}Co_{1/6}O_2$, $LiNi_{3/5}Mn_{1/5}Co_{1/5}O_2$, etc).

A carbon material such as carbon black (e.g., acetylene black, ketchen black, etc.) or graphite is used as a conductive assistant. A fluorocarbon resin such as polyvinylidene fluoride (PVDF) is used as a binder. Using a positive electrode mixture in which these materials are mixed with the positive electrode active material, a positive electrode active material containing layer can be formed, for example, on a current collector to form a positive electrode.

For the current collector of the positive electrode, a metal foil, a punching metal, a metal mesh, or an expanded metal made of aluminum or the like may be used. In general, an aluminum foil with a thickness of 10 to 30 μm can be suitably used.

A lead portion of the positive electrode is generally provided in the following manner. A part of the current collector remains exposed without forming the positive electrode active material containing layer when the positive electrode is produced, and thus this exposed portion can serve as the lead portion. However, the lead portion does not necessarily need to be integrated with the current collector from the beginning and may be provided by connecting an aluminum foil or the like to the current collector afterward.

There is no particular limitation to the negative electrode as long as a negative electrode that is used for a conventional lithium secondary battery, in other words, a negative electrode that contains an active material capable of intercalating and deintercalating Li ions is used. For example, for a negative electrode active material, one type of carbon materials capable of intercalating and deintercalating lithium, such as graphite, pyrolytic carbons, cokes, glassy carbons, a calcined organic polymer compound, mesocarbon microbeads (MCMB) and a carbon fiber, or a mixture of two or more types of these carbon materials are used. Moreover, elements such as Si, Sn, Ge, Bi, Sb and In and their alloys or oxides, compounds that can be charged/discharged at a low voltage close to lithium metal such as lithium-containing nitride, lithium containing complex oxides such as lithium titanate, a lithium metal, and a lithium/aluminum alloy also can be used as a negative electrode active material. The negative electrode may be produced in such a manner that a negative electrode mixture is obtained by adding a conductive assistant (e.g., a carbon material such as carbon black) and a binder such as PVDF appropriately to any of the negative electrode active materials, and then formed into a compact (a negative electrode active material containing layer) while a current collector is used as a core material. Alternatively, foils of the lithium metal or various alloys as described above can be used solely as an active material containing layer or in the form of a laminate on the current collector.

When the negative electrode includes a current collector, the current collector may be, for example, a metal foil, a punching metal, a metal mesh, or an expanded metal made of copper, nickel, aluminum or the like. In general, a copper foil is used. If the thickness of the whole negative electrode is reduced to achieve a battery with high energy density, the current collector of the negative electrode preferably has a thickness of 5 to 30 μm. Moreover, a lead portion of the negative electrode can be formed in the same manner as that of the positive electrode.

A stacked electrode formed by stacking the positive electrode and the negative electrode via the separator of the present invention or a wound electrode body formed by further winding the stacked electrode may be used.

For the nonaqueous electrolyte, a solution formed by dissolving a lithium salt in an organic solvent is used. The lithium salt is not particularly limited as long as it dissociates in the solvent to produce $Li^+$ ions and is less susceptible to side reactions such as decomposition in the working voltage range of a battery. For example, inorganic lithium salts such as $LiClO_4$, $LiPF_6$, $LiBF_4$, $LiAsF_6$ and $LiSbF_6$ and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($n \geq 2$) and $LiN(RfOSO_2)_2$ (where Rf represents a fluoroalkyl group) can be used as the lithium salt.

The organic solvent used for the nonaqueous electrolyte is not particularly limited as long as it dissolves the lithium salt and does not cause a side reaction such as decomposition in the working voltage range of a battery. Examples of the organic solvent include: cyclic carbonates such as an ethylene carbonate, a propylene carbonate, a butylene carbonate and a vinylene carbonate; chain carbonates such as a dimethyl carbonate, a diethyl carbonate and a methyl ethyl carbonate; chain ester such as methyl propionate; cyclic ester such as γ-butyrolactone; chain ether such as dimethoxyethane, diethyl ether, 1,3-dioxolane, diglyme, triglyme and tetraglyme; cyclic ether such as dioxane, tetrahydrofuran and 2-methyltetrahydrofuran; nitriles such as acetonitrile, propionitrile and methoxypropionitrile; and sulfurous ester such as ethylene glycol sulfite. The organic solvent may include two or more of these materials. A combination of the materials capable of achieving a high conductivity, for example, a mixed solvent of the ethylene carbonate and the chain carbonate is preferred for better characteristics of the battery. Moreover, to improve the safety, the charge/discharge cycle characteristic, the high-temperature storage characteristic, or the like of the nonaqueous electrolyte, additives such as vinylene carbonates, 1,3-propane sultone, diphenyl disulfide, cyclohexylbenzene, biphenyl, fluorobenzene, and t-butylbenzene can be appropriately added.

The concentration of the lithium salt in the nonaqueous electrolyte is preferably 0.5 to 1.5 mol/L, and more preferably 0.9 to 1.25 mol/L. The positive electrode including the positive electrode active material containing layer and the negative electrode including the negative electrode active material containing layer as described above may be produced in the following manner. A composition (slurry etc.) for forming the positive electrode active material containing layer is prepared by dispersing the positive electrode mixture in a solvent such as N-methyl-2-pyrrolidone (NMP). A composition (slurry etc.) for forming the negative electrode active material containing layer is prepared by dispersing the negative electrode mixture in a solvent such as NMP. These compositions are applied to the current collectors, and then dried. In this case, for example, a lithium secondary battery also can be configured using a laminated composite of the positive electrode and the separator and a laminated composite of the negative electrode and the separator. The laminated composite of the positive electrode and the separator is produced by applying the composition for forming the positive electrode active material containing layer to the current collector, and further applying the composition for forming the separator before the previously applied composition is dried. The laminated composite of the negative electrode and the separator is produced by applying the composition for forming the negative electrode active material containing layer to the current collector, and further applying the composition for forming the separator before the previously applied composition is dried.

Hereinafter, one example of the lithium secondary battery of the present invention will be described with reference to the drawings. FIG. 1A is a schematic plan view of the lithium secondary battery of the present invention and FIG. 1B is a schematic cross-sectional view of the lithium secondary battery of the present invention. Further, FIG. 2 is a schematic external view of the lithium secondary battery of the present invention.

With regard to the battery shown in FIGS. 1A, 1B and 2, each negative electrode 1 and each positive electrode 2 are wound spirally via a separator 3 of the present invention therebetween, and are further compressed and flattened to form a wound electrode body 6. The wound electrode body 6 is contained in a rectangular outer can 20 together with a nonaqueous electrolyte. In FIG. 1B, however, metal foils as current collectors for each of the negative electrode 1 and the positive electrode 2 and the nonaqueous electrolyte are not shown for the sake of brevity, and the central portion of the wound electrode body 6 and the separators 3 are not denoted with hatching that indicates a cross section.

The outer can 20 is made of aluminum alloy, and forms an outer package of the battery. The outer can 20 also serves as a positive electrode terminal. An insulator 5 composed of a polyethylene sheet is disposed on the bottom of the outer can 20, and negative electrode lead portions 8 and positive electrode lead portions 7, which are respectively connected to one end of the negative electrode 1 and that of the positive electrode 2, are pulled out from the wound electrode body 6 composed of the negative electrode 1, the positive electrode 2, and the separator 3. To a cover plate 9 made of aluminum alloy for sealing an opening portion of the outer can 20, a terminal 11 made of stainless steel is attached via an insulating packing 10 made of polypropylene. To the terminal 11, a lead plate 13 made of stainless steel is attached via an insulator 12.

The cover plate 9 is inserted in the opening portion of the outer can 20. By welding the junction of the cover plate 9 and the opening portion, the opening portion of the outer can 20 is sealed and the inside of the battery is sealed. Further, the cover plate 9 is provided with a nonaqueous electrolyte inlet 14. The nonaqueous electrolyte inlet 14 is sealed by, for example, laser beam welding in a state where a sealing member is inserted in the inlet so as to ensure the sealing properties of the battery. In FIGS. 1A, 1B and 2, the illustration of the nonaqueous electrolyte inlet 14 includes both the nonaqueous electrolyte inlet itself and the sealing member for the sake of convenience. Furthermore, the cover plate 9 is provided with a cleavage vent 15 as a mechanism for letting out gas in the battery when the internal pressure rises due to an increase in the temperature of the battery or the like.

In the lithium secondary battery shown in FIGS. 1A, 1B and 2, the outer can 20 and the cover plate 9 function as positive electrode terminals by welding the positive electrode lead portions 7 directly to the cover plate 9, and the terminal 11 functions as a negative electrode terminal by welding the negative electrode lead portions 8 to a lead plate 13 and conducting the negative electrode lead portions 8 and the terminal 11 through the lead plate 13. However, depending on the material, etc., of the outer can 20, the positive and the negative may be reversed.

The lithium secondary battery of the present invention can be applied to a variety of application purposes for which conventional lithium secondary batteries are used.

EXAMPLES

Hereinafter, the present invention will be described in details by way of Examples. Note that the present invention is not limited to the following Examples. The volume content of each component in the separator of each Example is expressed as the ratio of the volume of each component to the volume of all components except a nonwoven fabric. Further, the melting point (melting temperature) of the heat-melting resin particles in each Example is a value measured with a DSC according to the regulations of JIS K 7121.

Example 1

Production of Separator

As the inorganic oxide particles, plate-like boehmite (aspect ratio: 10) was washed repeatedly with water and dried at 120° C. 0.5 g of the dried plate-like boehmite was immersed in 25 cm$^3$ of ion exchange water at 25° C. for 12 hours. Following the immersion, the ion exchange water was diluted by 10 times and an amount of alkali metal elements eluted into the ion exchange water was measured through an ICP spectroscopic analysis. The result showed that Na was substantially the only constituent of the alkali metal elements and the amount of the alkali metal elements was 500 ppm based on the weight of the plate-like boehmite.

500 g of ion exchange water and 5 g of a dispersing agent including 40 mass % of ammonium polycarboxylate were added to 500 g of the plate-like boehmite that had been washed with water, and they were dispersed using a ball mill to prepare a dispersion solution. The particle size of the plate-like boehmite in the dispersion solution was measured using a laser diffraction particle size analyzer. The average particle size (D50%) with an accumulated volume percentage was 0.8 μm.

3 g of self-cross-linking poly(butyl acrylate) dispersion (solid content: 45 mass %) as a binder was added to 500 g of the dispersion solution. They were stirred for three hours using a Three-One motor to obtain a composition for forming a separator (1). The solid content of the composition for forming a separator (1) was 55 mass %.

A PET nonwoven fabric (width: 200 mm, thickness: 17 μm, weight: 10 g/m$^2$) was used as a sheet material formed of the fibrous material. The PET nonwoven fabric was immersed into and pulled up from the composition for forming a separator (1) at a rate of 1 m/min to apply the composition for forming a separator (1) to the PET nonwoven fabric. Afterwards, the PET nonwoven fabric was dried and the separator was obtained. The obtained separator had a thickness of 25 μm, a porosity of 50% and a Gurley value of 200 sec. In the separator, when the specific gravity of the boehmite was 3.0 g/cm$^3$ and that of the binder was 1.0 g/cm$^3$, the volume content of the plate-like boehmite was calculated as 75%.

<Production of Positive Electrode>

85 parts by mass of LiCoO$_2$ as a positive electrode active material, 10 parts by mass of acetylene black as a conductive assistant and 5 parts by mass of PVDF as a binder were mixed uniformly in NMP as a solvent to prepare a positive electrode mixture containing paste. This paste was intermittently applied to both sides of an aluminum foil (current collector) with a thickness of 15 μm so that the applied length of the active material was 280 mm on the upper surface and 210 mm on the lower surface, which then was dried and calendered. The thicknesses of the positive electrode active material containing layers were adjusted so that the total thickness was 150 μm. Subsequently, this current collector having the positive electrode active material containing layers was cut into a width of 43 mm, thus producing a positive electrode with a length of 280 mm and a width of 43 mm. Moreover, a lead portion was formed by welding a tab to the exposed portion of the aluminum foil of the positive electrode.

<Preparation of Negative Electrode>

90 parts by mass of graphite as a negative electrode active material and 10 parts by mass of PVDF as a binder were mixed uniformly in NNW as a solvent to prepare a negative electrode mixture containing paste. This negative electrode mixture containing paste was intermittently applied to both sides of a current collector made of copper foil with a thickness of 10 μm so that the applied length of the active material was 290 mm on the upper surface and 230 mm on the lower surface, which then was dried and calendered. The thicknesses of the negative electrode active material containing layers were adjusted so that the total thickness was 142 μm. Subsequently, this current collector having the negative electrode active material containing layers was cut into a width of 45 mm, thus producing a negative electrode with a length of 290 mm and a width of 45 mm. Moreover, a lead portion was formed by welding a tab to the exposed portion of the copper foil of the negative electrode.

<Assembly of Battery>

The positive electrode and the negative electrode were wound in a spiral form via the separator to obtain a wound electrode body. This wound electrode body was compressed into a flat form and inserted in a rectangular outer can (height: 48 mm, width: 33 mm, thickness: 4 mm). A nonaqueous electrolyte (a solution obtained by dissolving $LiPF_6$ to be a concentration of 1.2 mol/L in a mixture solvent of ethylene carbonate and ethyl methyl carbonate at a volume ratio of 1:2) was poured, and the opening of the outer can was sealed, thus producing a lithium secondary battery Example 2

A separator was produced in the same manner as Example 1 except that granular boehmite was used as the inorganic oxide particles and the amount of the dispersing agent added was changed to 12.5 g. The separator had a thickness of 20 μm, a porosity of 40% and a Gurley value of 100 sec and the volume content of the boehmite in the separator was 75%. An amount of alkali metal elements eluted from the granular boehmite washed with water was measured in the same manner as Example 1. The amount was 40 ppm based on the weight of the granular boehmite, and roughly the entire amount was of Na. Further, the average particle size (D50%) of the granular boehmite measured in the same manner as Example 1 was 0.4 μm. A lithium secondary battery was produced in the same manner as Example 1 except that the above-described separator was used.

Example 3

3 g of self-cross-linking poly(butyl acrylate) dispersion (solid content: 45 mass %) and 5 g of PE emulsion (melting point of PE: 130° C., solid content: 45 mass %) as the heat-melting resin particles were added to 500 g of the same plate-like boehmite dispersion solution as that used in Example 1, and they then was stirred for three hours using a One-Three motor to obtain a composition for forming a separator (2). The solid content of the composition for forming a separator (2) was 55 mass %.

A separator was produced in the same manner as Example 1 except that the composition for forming a separator (2) was used. The obtained separator had a thickness of 20 μm, a porosity of 40% and a Gurley value of 100 sec. In the separator, when the specific gravity of the boehmite was 3.0 g/cm³, that of the binder was 1.0 g/cm³ and that of the PE was 1.0 g/cm³, the volume content of the plate-like boehmite was calculated as 50%.

A lithium secondary battery was produced in the same manner as Example 1 except that the above-described separator was used.

Example 4

A separator was produced in the same manner as Example 3 except that the same granular boehmite as that used in Example 2 was used in place of the plate-like boehmite. The obtained separator had a thickness of 20 μm, a porosity of 40% and a Gurley value of 100 sec. The volume content of the granular boehmite in the separator calculated in the same manner as Example 3 was 50%.

A lithium secondary battery was produced in the same manner as Example 1 except that the above-described separator was used.

Comparative Example 1

A separator was produced in the same manner as Example 1 except that the same plate-like boehmite as that used in Example 1 was used without being washed with water. The obtained separator had a thickness of 25 μm, a porosity of 40% and a Gurley value of 100 sec. An amount of alkali metal elements eluted from the plate-like boehmite unwashed with water was measured in the same manner as Example 1. The amount was 2400 ppm based on the weight of the plate-like boehmite, and roughly the entire amount was of Na.

A lithium secondary battery was produced in the same manner as Example 1 except that the above-described separator was used.

Comparative Example 2

A separator was produced in the same manner as Example 1 except that the same plate-like boehmite as that used in Example 1 was washed with water only once. The obtained separator had a thickness of 20 μm, a porosity of 40% and a Gurley value of 100 sec. An amount of alkali metal elements eluted from the plate-like boehmite washed with water was measured in the same manner as Example 1. The amount was 1200 ppm based on the weight of the plate-like boehmite, and roughly the entire amount was of Na.

A lithium secondary battery was produced in the same manner as Example 1 except that the above-described separator was used.

Aside from producing the lithium secondary batteries, for each of the separators of Examples 1 to 4 and Comparative Examples 1 and 2, the ratio of an amount of eluted alkali metal elements to the weight of the original separator was determined as follows. 0.5 g of each separator sample was immersed in 25 cm³ of ion exchange water at 25° C. for 12 hours, and the ion exchange water after the immersion was diluted by 10 times and the amount of alkali metal elements eluted into the ion exchange water was measured through an ICP spectroscopic analysis. Table 1 provides the results together with the amount of alkali metal elements eluted from the inorganic oxide particles used in each separator. Roughly, the entire amount of the alkali metal elements eluted from each separator was of Na.

TABLE 1

| | Inorganic Oxide Particles | | Separator |
| --- | --- | --- | --- |
| | Amount of Na eluted (ppm) | Amount of alkali metal elements eluted (ppm) | Amount of alkali metal elements eluted (ppm) |
| Ex. 1 | 500 | 500 | 450 |
| Ex. 2 | 40 | 40 | 36 |
| Ex. 3 | 500 | 500 | 375 |
| Ex. 4 | 40 | 40 | 30 |
| Comp. Ex. 1 | 2400 | 2400 | 2160 |
| Comp. Ex. 2 | 1200 | 1200 | 1080 |

Next, on the lithium secondary batteries of Examples 1 to 4 and Comparative Examples 1 to 2, the following charge/discharge cycle test was conducted.

<Charge/Discharge Cycle Test>

To charge each battery, a constant-current and constant-voltage charge was performed, that is, a constant-current charge was performed at a current value of 850 mA (corresponding to 1C) until the battery voltage reached 4.2 V, and subsequently a constant-voltage charge was performed at a voltage of 4.2 V (total charging time: 3 hours). To discharge each battery, a constant-current discharge was performed at a current value of 850 mA until the battery voltage reached 2.75 V A series of the charge and the discharge operations were defined as one cycle, and the batteries were charge/discharge repeatedly up to 500 cycles. The discharge capacity of each battery at 1st, 300th and 500th cycles (A, B and C, respectively) in the charge/discharge cycle test, and the ratio of the discharge capacity at the 500th cycle (C) to the discharge capacity at the first cycle (A) (C/A) was determined to evaluate the characteristics in an extended period of use. Table 2 provides the results.

TABLE 2

| | Discharge Capacity at Each Cycle (mAh) | | | Capacity |
|---|---|---|---|---|
| | A | B | C | Ratio C/A |
| Ex. 1 | 850 | 750 | 720 | 0.85 |
| Ex. 2 | 848 | 748 | 720 | 0.85 |
| Ex. 3 | 850 | 747 | 717 | 0.84 |
| Ex. 4 | 848 | 749 | 715 | 0.84 |
| Comp. Ex. 1 | 854 | 750 | 400 | 0.47 |
| Comp. Ex. 2 | 852 | 750 | 420 | 0.49 |

As can be seen from Table 2, up to the 300th cycle, the discharge capacities of the lithium secondary batteries of Examples 1 to 4 and Comparative Examples 1 to 2 do not vary from each other much. However, the capacities of the batteries of Comparative Examples 1 and 2 deteriorated significantly after the 300th cycle and beyond and they varied significantly from the capacities of the batteries of Examples 1 to 4 at the 500th cycle. Further, after the test (after 500 cycles of charge/discharge), it was found that the outer cans of the batteries of Comparative Examples 1 and 2 were swelled about 0.5 mm. Each of the batteries was disassembled after the test. For each of the batteries of Comparative Examples 1 and 2, the color of the substantially water clear nonaqueous electrolyte was changed to blackish brown. It is reasonable to think that Na eluted from the inorganic oxide particles was involved in the side reaction of the nonaqueous electrolyte, such as degradation reaction. In contrast, the lithium secondary batteries of Examples 1 to 4 each maintained a high capacity even they were charged/discharged repeatedly for 500 cycles, and that the batteries with excellent reliability whose characteristics deteriorated less when they were used for an extended period were able to form.

Furthermore, the following storage test was conducted on the different batteries from those on which the charge/discharge cycle test was conducted.

<Storage Test>

The batteries were charged under the same conditions as the charging conditions described above, and subsequently, they were stored in a thermostat at 60° C. for 20 days in a charged state. Then, each battery was discharged at a constant current of 850 mA until the battery voltage reached 2.75 V Further, they were charged/discharged under the same conditions as the conditions described above to measure the discharge capacity (D) of each battery after the storage test. The ratio of the discharge capacity after the storage test (D) to the discharge capacity at the first cycle (A) in the charge/discharge cycle test (D/A) was determined to evaluate the characteristics in long-term storage. Table 3 provides the results.

TABLE 3

| | Discharge Capacity (mAh) | | Capacity |
|---|---|---|---|
| | A | D | Ratio D/A |
| Ex. 1 | 850 | 808 | 0.95 |
| Ex. 2 | 848 | 805 | 0.95 |
| Ex. 3 | 850 | 808 | 0.95 |
| Ex. 4 | 848 | 805 | 0.95 |
| Comp. Ex. 1 | 854 | 775 | 0.91 |
| Comp. Ex. 2 | 852 | 760 | 0.89 |

As can be seen from Table 3, with regard to the lithium secondary batteries of Examples 1 to 4, a drop in discharge capacity resulting from the storage test at the high temperature was small, and they have an excellent storage characteristic (long-term storage characteristic).

Example 5

Onto both sides of the same negative electrode as that used in Example 1, the same composition for forming a separator (1) as that used in Example 1 and the same PE emulsion as that used in Example 3 were applied in layers so that the composition for forming a separator (1) came into contact with the negative electrode, followed by drying, thus producing a negative electrode having a separator with a two layered structure of a supporting layer and a shutdown layer on each side (a laminated composite of the negative electrode active material containing layer and the separators). In each of the separators, the thickness of the supporting layer was 20 μm (per one side of the negative electrode), the thickness of the shutdown layer was 5 μm (per one side of the negative electrode) and the porosity was 40%. Further, in each of the separators, when the specific gravity of the boehmite was 3.0 g/cm$^3$, that of the binder was 1.0 g/cm$^3$ and that of the PE was 1.0 g/cm$^3$, the volume content of the plate-like boehmite was calculated as 50%.

A lithium secondary battery was produced in the same manner as Example 1 except that the negative electrode and the separator were replaced with the laminated composite of the negative electrode and the separators.

Example 6

The same composition for forming a separator (1) as that used in Example 1 was applied onto one side of a commercially-available polyethylene macroporous film (melting point: 135° C., thickness: 15 μm) using a die coater and dried to obtain a separator. The obtained separator had a thickness of 18 μm, a porosity of 50% and a Gurley value of 200 sec. Thereafter, a lithium secondary battery was produced in the same manner as Example 1. Virtually, no warping was found on the produced separator.

Comparative Example 3

Onto both sides of the same negative electrode as that used in Example 1, the same composition for forming a separator as that used in Comparative Example 1 and the same PE emulsion as that used in Example 3 were applied in layers so that the composition for forming a separator came into contact with the negative electrode, followed by drying, thus producing a negative electrode having a separator with a two layered structure of a supporting layer and a shutdown layer on each side (a laminated composite of the negative electrode active material containing layer and the separators). In each of the separators, the thickness of the supporting layer was 20 µm (per one side of the negative electrode), the thickness of the shutdown layer was 5 µm (per one side of the negative electrode) and the porosity was 40%.

A lithium secondary battery was produced in the same manner as Example 1, except that the negative electrode and the separator were replaced with the laminated composite of the negative electrode and the separators.

An amount of alkali metal elements eluted from each separator removed from the laminated composite of the negative electrode and the separators of Example 5 and that of Comparative Example 3 and from the separator of Example 6 was determined in the same manner as the separator of Example 1, etc., and Table 4 provides the results. Na was substantially the only constituent of the alkali metal elements eluted from each of the separators.

TABLE 4

|  | Inorganic Oxide Particles | | Separator |
| --- | --- | --- | --- |
|  | Amount of Na eluted (ppm) | Amount of alkali metal elements eluted (ppm) | Amount of alkali metal elements eluted (ppm) |
| Ex. 5 | 500 | 500 | 375 |
| Ex. 6 | 500 | 500 | 215 |
| Comp. Ex. 3 | 2400 | 2400 | 1800 |

On the lithium secondary batteries of Examples 5 and 6 and Comparative Example 3, the charge/discharge cycle test and the storage test were conducted in the same manner as the battery of Example 1, etc. Table 5 provides the results of the charge/discharge cycle test and Table 6 provides the results of the storage test.

TABLE 5

|  | Discharge capacity at each cycle (mAh) | | | Capacity |
| --- | --- | --- | --- | --- |
|  | A | B | C | ratio C/A |
| Ex. 5 | 850 | 750 | 720 | 0.85 |
| Ex. 6 | 852 | 795 | 750 | 0.88 |
| Comp. Ex. 3 | 854 | 750 | 400 | 0.47 |

TABLE 6

|  | Discharge capacity (mAh) | | Capacity |
| --- | --- | --- | --- |
|  | A | D | Ratio D/A |
| Ex. 5 | 850 | 808 | 0.95 |
| Ex. 6 | 852 | 821 | 0.96 |
| Comp. Ex. 3 | 854 | 775 | 0.91 |

As can be seen from Tables 5 and 6, similarly to the lithium secondary batteries of Examples 1 to 4 listed on Tables 2 and 3, the lithium secondary batteries of Examples 5 and 6 have less characteristic deterioration when they are used for an extended period, as well as an excellent long-term storage characteristic and excellent reliability.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

According to the present invention, it is possible to provide a lithium secondary battery with a high degree of reliability, whose characteristics deteriorate less when it is used or stored for an extended period.

DESCRIPTION OF REFERENCE NUMERALS

1 negative electrode
2 positive electrode
3 separator
5 insulator
6 wound electrode body
7 positive electrode lead portion
8 negative electrode lead portion
9 cover plate
10 insulating packing
11 terminal
12 insulator
13 lead plate
14 nonaqueous electrolyte inlet
15 cleavage vent
20 outer can

The invention claimed is:

1. A porous film for a separator comprising inorganic oxide particles and a binder for binding the inorganic oxide particles together,
   wherein the inorganic oxide particles include boehmite,
   a proportion of the inorganic oxide particles is 99.5% by volume or less,
   an average particle size of the inorganic oxide particles is in a range of 0.01 µm to 5 µm,
   the porous film for a separator has a thickness of 1 µm or more and 10 µm or less, and
   an amount of water-elutable Na contained in the porous film is 10 ppm or more and 1000 ppm or less.

2. The porous film for a separator according to claim 1, wherein an amount of water-elutable Na included in the inorganic oxide particles is 10 ppm or more and 600 ppm or less.

3. The porous film for a separator according to claim 1, wherein the inorganic oxide particles include plate-like particles.

4. The porous film for a separator according to claim 1, wherein a proportion of the inorganic oxide particles is 50% by volume or more.

5. The porous film for a separator according to claim 1, wherein the porous film for a separator has a thickness of 3 µm or more.

6. A battery separator comprising the porous film for a separator according to claim 1 and a microporous film including a heat-melting resin layer having a melting point of 80 to 140° C.

7. The battery separator according to claim 6, wherein the porous film for a separator is formed on the microporous film.

8. The battery separator according to claim 6, wherein a thickness of the porous film for a separator is 10% or more of a thickness of the microporous film.

9. The battery separator according to claim 6, wherein a thickness of the porous film for a separator is 50% or less of a thickness of the microporous film.

10. The battery separator according to claim 6, wherein the microporous film has a thickness of 30 μm or less.

11. The battery separator according to claim 6, wherein the melting point of the heat-melting resin is 130° C. or less.

12. The battery separator according to claim 6, wherein a proportion of the inorganic oxide particles is 10% by volume or more.

13. The battery separator according to claim 12, wherein the proportion of the inorganic oxide particles is 30% by volume or more.

14. The battery separator according to claim 6, wherein a proportion of the inorganic oxide particles is 80% by volume or less.

15. The battery separator according to claim 6, wherein the battery separator has a thickness of 50 μm or less.

16. A battery electrode comprising an active material containing layer and the porous film for a separator according to claim 1,
wherein the active material containing layer and the porous film for a separator are integrated with each other.

17. A lithium secondary battery comprising a positive electrode, a negative electrode, a separator and a nonaqueous electrolyte,
wherein the separator is the battery separator according to claim 6.

18. A lithium secondary battery comprising a positive electrode, a negative electrode, a separator and a nonaqueous electrolyte,
wherein at least one of the positive electrode and the negative electrode is the battery electrode according to claim 16.

19. A method for manufacturing a porous film for a separator, comprising steps of:
washing inorganic oxide particles with water to reduce an amount of water-elutable alkali metal elements included in the inorganic oxide particles to 10 ppm or more and 1000 ppm or less; and
binding the inorganic oxide particles together with a binder to form a porous film containing the inorganic oxide particles.

20. The method for manufacturing a porous film for a separator according to claim 19, wherein the inorganic oxide particles include boehmite.

21. A method for manufacturing a battery separator, comprising steps of:
washing inorganic oxide particles with water to reduce an amount of water-elutable alkali metal elements included in the inorganic oxide particles to 10 ppm or more and 1000 ppm or less; and
binding the inorganic oxide particles together with a binder to form a porous film containing the inorganic oxide particles on a microporous film including a heat-melting resin layer having a melting point of 80 to 140° C.

22. A method for manufacturing a battery electrode, comprising steps of:
washing inorganic oxide particles with water to reduce an amount of water-elutable alkali metal elements included in the inorganic oxide particles to 10 ppm or more and 1000 ppm or less; and
binding the inorganic oxide particles together with a binder to form a porous film containing the inorganic oxide particles on an electrode including an active material containing layer.

* * * * *